US 9,992,395 B2

United States Patent
Yamatsuta et al.

(10) Patent No.: US 9,992,395 B2
(45) Date of Patent: Jun. 5, 2018

(54) INTERCHANGEABLE LENS AND COMMUNICATION METHOD THEREOF, AND IMAGING DEVICE AND COMMUNICATION METHOD THEREOF

(71) Applicant: SONY CORPORATION, Tokyo (JP)

(72) Inventors: Yoshinori Yamatsuta, Tokyo (JP); Jun Aoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/423,618

(22) Filed: Feb. 3, 2017

(65) Prior Publication Data

US 2017/0223241 A1  Aug. 3, 2017

Related U.S. Application Data

(63) Continuation of application No. 15/145,399, filed on May 3, 2016, now abandoned.

(30) Foreign Application Priority Data

Feb. 2, 2016  (JP) .................. 2016-018023

(51) Int. Cl.
*H04N 5/225* (2006.01)
*H04N 5/232* (2006.01)

(52) U.S. Cl.
CPC ....... *H04N 5/2254* (2013.01); *H04N 5/23232* (2013.01); *H04N 5/23241* (2013.01); *H04N 5/23287* (2013.01); *H04N 5/23296* (2013.01)

(58) Field of Classification Search
CPC ............. H04N 5/2254; H04N 5/23296; H04N 5/23287; H04N 5/23232; H04N 5/23241
See application file for complete search history.

(56) References Cited

U.S. PATENT DOCUMENTS

| | | | |
|---|---|---|---|
| 5,196,880 A | 3/1993 | Ishibashi et al. | |
| 7,978,967 B2* | 7/2011 | Shibuno | G03B 3/10 348/363 |
| D670,751 S | 11/2012 | Koyama et al. | |
| 8,374,499 B2* | 2/2013 | Sakamoto | G03B 17/14 396/532 |
| 8,441,570 B2* | 5/2013 | Tsuda | G03B 7/095 348/222.1 |
| 9,143,660 B2 | 9/2015 | Kawada | |
| 2010/0110278 A1 | 5/2010 | Higurashi | |
| 2011/0292238 A1 | 12/2011 | Katsumata | |
| 2011/0292272 A1 | 12/2011 | Terashima et al. | |
| 2012/0294598 A1 | 11/2012 | Oikawa et al. | |
| 2015/0281534 A1 | 10/2015 | Nakata | |

OTHER PUBLICATIONS

*Interchangeable Lens Digital Camera*, instruction manual, Sony 4-183-856-15(1), NEX-3NEX-5; HTTP://www.sony.net/, 2010, (82 pages).
*Interchangeable Lens*, Operating Instruction Manual, Sony 4-191-478-05(1), http://www.sony.net/, 2010 (2 pages).

* cited by examiner

*Primary Examiner* — Padma Haliyur
(74) *Attorney, Agent, or Firm* — Oblon, McClelland, Maier & Neustadt, L.L.P.

(57) ABSTRACT

Provided is an interchangeable lens including: at least one shared communication terminal configured to be shared and used in synchronous communication that is communication performed synchronously with a synchronization signal and in asynchronous communication that is communication performed asynchronously with the synchronization signal.

20 Claims, 10 Drawing Sheets

| TERMINAL NUMBER | FUNCTION |
|---|---|
| 1 (LP1, BP1) | CHIP SELECT SIGNAL |
| 2 (LP2, BP2) | SERIAL DATA |
| 3 (LP3, BP3) | SERIAL DATA |
| 4 (LP4, BP4) | CHIP SELECT SIGNAL |
| 5 (LP5, BP5) | POWER SUPPLY |
| 6 (LP6, BP6) | SYNCHRONIZATION SIGNAL |
| 7 (LP7, BP7) | GROUND (GND) |
| 8 (LP8, BP8) | POWER SUPPLY |

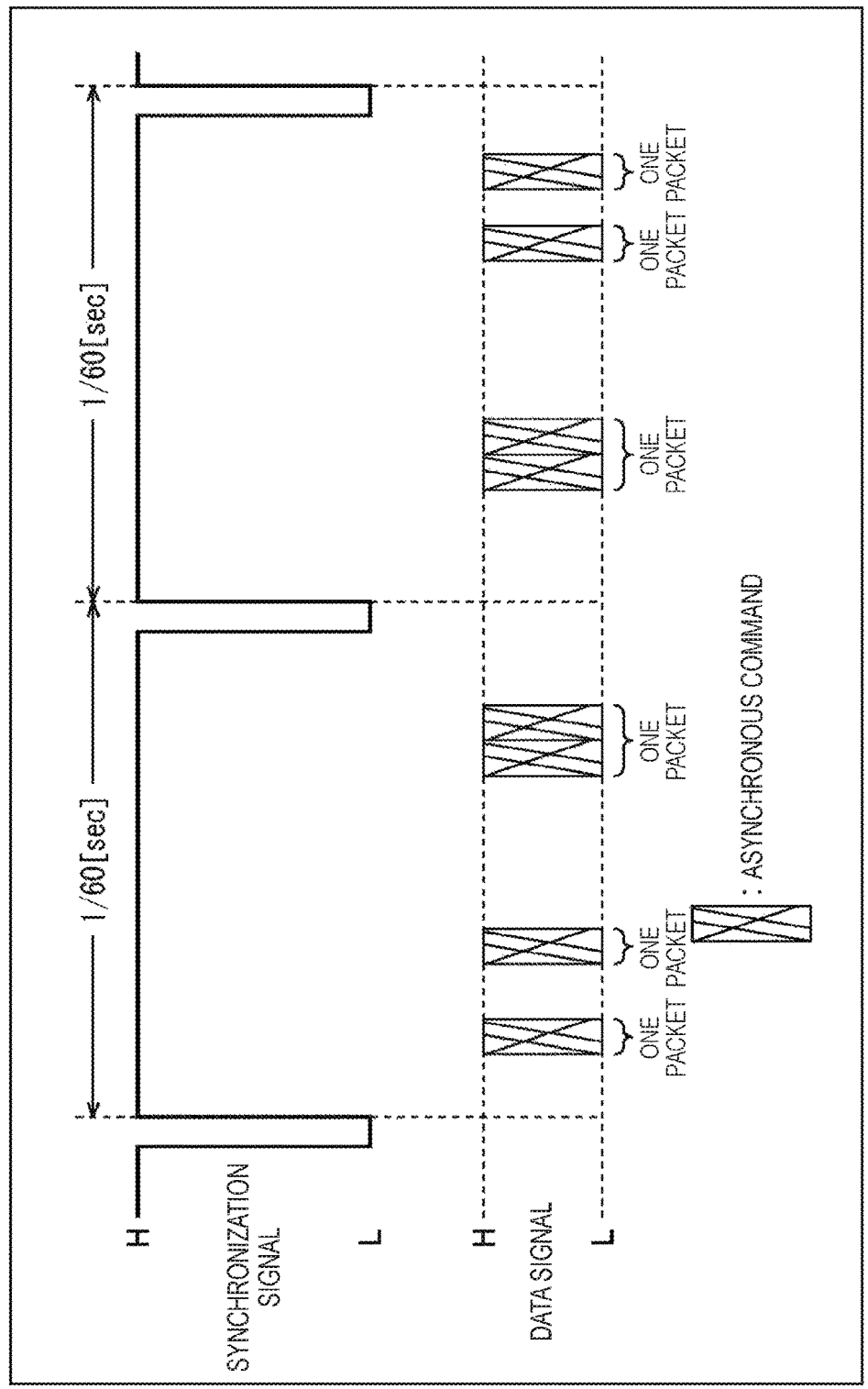

INTERCHANGEABLE LENS AND COMMUNICATION METHOD THEREOF, AND IMAGING DEVICE AND COMMUNICATION METHOD THEREOF

CROSS REFERENCE TO RELATED APPLICATIONS

This application is a continuation of U.S. application Ser. No. 15/145,399, filed May 3, 2016, which claims the priority to Japanese Patent Application JP 2016-018023, filed in Japan on Feb. 2, 2016, the entire contents of which are incorporated herein by reference.

BACKGROUND

The present technology relates to an interchangeable lens and a communication method thereof, and an imaging device and a communication method thereof, and particularly relates to an interchangeable lens and a communication method thereof, and an imaging device and a communication method thereof which can enable highly efficient communication with a small number of terminals.

In an interchangeable-lens digital camera whose lens is interchangeable according to photographing purposes (which will be referred to as an interchangeable lens below), communication occurs between an imaging device on the body side and the interchangeable lens, unlike a lens-integrated digital camera. Thus, it is important for such an interchangeable-lens digital camera that puts emphasis on readiness and mobility to make communication occurring between an imaging device and an interchangeable lens efficient and to shorten a processing time.

To this end, JP 2012-237932A, for example, discloses a technology of enabling an interchangeable-lens digital camera to perform two kinds of synchronous communication that are first synchronous communication and second synchronous communication in parallel to shorten a processing time.

SUMMARY

In the technology of JP 2012-237932A, however, 4 terminals are necessary for each of the first synchronous communication and the second synchronous communication, and 8 terminals are necessary in communication overall, and therefore, a physical restriction increases accordingly.

The present technology takes such a circumstance into consideration, and aims to make highly efficient communication possible with a small number of terminals.

According to a first embodiment of the present technology, an interchangeable lens includes: at least one shared communication terminal configured to be shared and used in synchronous communication that is communication performed synchronously with a synchronization signal and in asynchronous communication that is communication performed asynchronously with the synchronization signal.

According to the first embodiment of the present technology, a communication method is performed by an interchangeable lens which includes at least one shared communication terminal that is shared and used in synchronous communication that is communication performed synchronously with a synchronization signal and in asynchronous communication that is communication performed asynchronously with the synchronization signal, the communication method including: communicating a command of the synchronous communication and a command of the asynchronous communication via the at least one shared communication terminal.

According to the first embodiment of the present technology, an interchangeable lens is provided with at least one shared communication terminal configured to be shared and used in synchronous communication that is communication performed synchronously with a synchronization signal and in asynchronous communication that is communication performed asynchronously with the synchronization signal. A command of the synchronous communication and a command of the asynchronous communication are communicated via the at least one shared communication terminal.

According to a second embodiment of the present technology, an imaging device includes: at least one shared communication terminal configured to be shared and used in synchronous communication that is communication performed synchronously with a synchronization signal and in asynchronous communication that is communication performed asynchronously with the synchronization signal.

According to the second embodiment of the present technology, a communication method is performed by an imaging device which includes at least one shared communication terminal that is shared and used in synchronous communication that is communication performed synchronously with a synchronization signal and in asynchronous communication that is communication performed asynchronously with the synchronization signal, the communication method including: communicating a command of the synchronous communication and a command of the asynchronous communication via the at least one shared communication terminal.

According to the second embodiment of the present technology, an imaging device is provided with at least one shared communication terminal configured to be shared and used in synchronous communication that is communication performed synchronously with a synchronization signal and in asynchronous communication that is communication performed asynchronously with the synchronization signal. A command of the synchronous communication and a command of the asynchronous communication are communicated via the at least one shared communication terminal.

According to the first and second embodiments of the present technology, highly efficient communication can be performed with a small number of terminals.

It should be noted that the advantageous effects of the present technology are not limited to the advantageous effects described herein, and may include any advantageous effect described in the present disclosure.

BRIEF DESCRIPTION OF THE DRAWINGS

FIG. 11 is a time chart showing an example of packet communication of Step S7 of FIG. 8.

DETAILED DESCRIPTION OF THE EMBODIMENT(S)

Hereinafter, preferred embodiments for implementing the present technology (which will be referred to as embodiments below) will be described.

<Block Diagram of an Imaging System>

Figure 1:
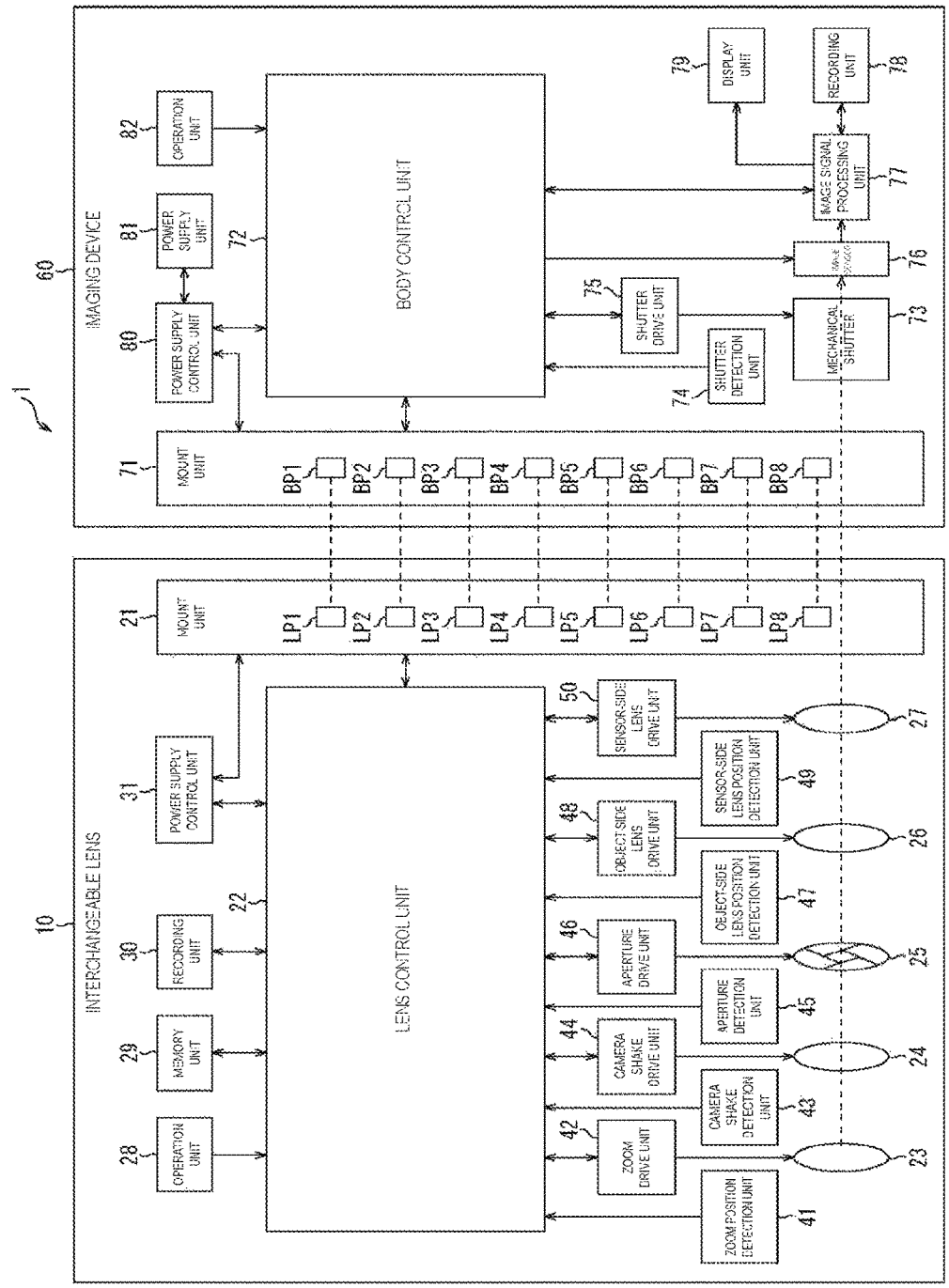
FIG. 1 is a block diagram showing a configuration example of an embodiment of an imaging system to which an embodiment of the present technology is applied.

FIG. 1 is a block diagram showing a configuration example of an embodiment of an imaging system to which an embodiment of the present technology is applied.

The imaging system 1 of FIG. 1 is an interchangeable lens type digital camera, and includes a detachable interchangeable lens 10 and an imaging device 60 on a body side.

The interchangeable lens 10 has a mount unit 21 that is detachably mounted on a mount unit 71 of the imaging device 60. The mount unit 21 has 8 terminals LP1 to LP8 that electrically connect the lens with the imaging device 60.

In addition, the interchangeable lens 10 includes a lens control unit 22, a zoom lens 23, a camera shake correction lens 24, an aperture 25, an object-side focus lens 26, a sensor-side focus lens 27, an operation unit 28, a memory unit 29, a recording unit 30, and a power supply control unit 31.

The interchangeable lens 10 has two kinds of focus lenses which are the object-side focus lens 26 and the sensor-side focus lens 27 for auto-focus control, and among the two kinds of focus lenses, the object-side focus lens 26 is a focus lens close to an object lens (not illustrated) and the sensor-side focus lens 27 is a focus lens close to an image sensor 76 of the imaging device 60. Note that each of the object-side focus lens 26 and the sensor-side focus lens 27 includes one or a plurality of optical components.

The lens control unit 22 is constituted by an arithmetic processing device, for example, a central processing unit (CPU) or a micro processing unit (MPU), a peripheral circuit, and the like, and reads and executes a predetermined control program recorded in the recording unit 30 to control the whole interchangeable lens 10.

The lens control unit 22 controls a position of the zoom lens 23 according to, for example, an instruction from the imaging device 60 supplied via a predetermined communication terminal among the terminals LP1 to LP8 of the mount unit 21 or a user operation received by the operation unit 28. More specifically, the lens control unit 22 acquires a current position of the zoom lens 23 from a zoom position detection unit 41, decides a drive direction and a drive amount for moving the zoom lens 23 to a predetermined position based on the acquisition result, and outputs the decided drive direction and drive amount to a zoom drive unit 42 along with a movement command. The zoom position detection unit 41 is constituted by, for example, a magnetic sensor (a MR sensor) or the like to detect a position of the zoom lens 23 and supplies the position to the lens control unit 22. The zoom drive unit 42 moves the zoom lens 23 in the optical axis direction to satisfy the instructed drive direction and drive amount based on the movement command supplied from the lens control unit 22.

In addition, the lens control unit 22 controls the camera shake correction lens 24 to correct camera shakes. Specifically, the lens control unit 22 decides a drive direction and a drive amount of the camera shake correction lens 24 in the direction in which a camera shake amount is negated based on the camera shake amount detected by the camera shake detection unit 43, and outputs the decided drive direction and drive amount to a camera shake drive unit 44 along with the movement command. The camera shake detection unit 43 is constituted by a gyro sensor, a triaxial acceleration sensor, and the like. The gyro sensor is used to detect a deviation (a shake) in a direction corresponding to pitch or yaw as a correction direction of the camera shake correction lens 24, and the triaxial acceleration sensor is used to detect a deviation (a shake) in directions of an X axis and a Y axis when the optical axis direction is set to a Z axis. The camera shake detection unit 43 may be either or both of a gyro sensor and a triaxial acceleration sensor. The camera shake drive unit 44 moves the camera shake correction lens 24 to satisfy the instructed drive direction and drive amount based on the movement command supplied from the lens control unit 22.

The lens control unit 22 controls (the opening diameter of) the aperture 25 according to an instruction from the imaging device 60 supplied via a predetermined communication terminal among the terminals LP1 to LP8 of the mount unit 21 or the like. Specifically, the lens control unit 22 acquires the opening diameter of the aperture 25 detected by an aperture detection unit 45, and commands an aperture drive unit 46 to have the f-number instructed by the imaging device 60 to drive the aperture 25. The aperture drive unit 46 drives the aperture 25 to have the opening diameter instructed by the lens control unit 22.

Furthermore, the lens control unit 22 controls the two kinds of focus lenses that are the object-side focus lens 26 and the sensor-side focus lens 27. Specifically, the lens control unit 22 acquires a current position of the object-side focus lens 26 from an object-side lens position detection unit 47, decides a drive direction and a drive amount for moving the object-side focus lens 26 to a predetermined position based on the acquisition result, and outputs the decided drive direction and drive amount to an object-side lens drive unit 48 along with the movement command. The object-side lens drive unit 48 moves the object-side focus lens 26 in the optical axis direction to satisfy the instructed drive direction and drive amount. Likewise, the lens control unit 22 acquires a current position of the sensor-side focus lens 27 from a sensor-side lens position detection unit 49, decides a drive direction and a drive amount for moving the sensor-side focus lens 27 to a predetermined position based on the acquisition result, and outputs the decided drive direction and drive amount to a sensor-side lens drive unit 50 along with a movement command. The sensor-side lens drive unit 50 moves the sensor-side focus lens 27 in the optical direction to satisfy the instructed drive direction and drive amount.

The object-side lens position detection unit 47 and the sensor-side lens position detection unit 49 can be composed of, for example, a magnetic sensor, a photodiode array, a potentiometer, a reflective encoder, and the like.

For the object-side lens drive unit 48 and the sensor-side lens drive unit 50, for example, an ultrasonic motor, a DC motor, a linear actuator, a stepping motor, a piezo element (piezoelectric element), or the like can be used; however, when a focus lens with a large lens diameter, a large lens thickness, and a heavy weight is to be driven, a DC motor or an ultrasonic motor is preferable. When the interchangeable lens 10 includes the two kinds of focus lenses that are the object-side focus lens 26 and the sensor-side focus lens 27, the object-side focus lens 26 is generally heavier.

Note that the interchangeable lens 10 does not necessarily have to have two kinds of focus lenses, and either the object-side focus lens 26 or the sensor-side focus lens 27 may be omitted. In this case, the lens position detection unit and the lens drive unit that are necessary for controlling the omitted focus lens are also omitted.

The operation unit 28 corresponds to a zoom ring which manually sets a zoom magnification, a focus ring which manually sets a focus lens, or the like, and receives a manual operation of a user, and supplies an operation signal corresponding to the received operation to the lens control unit 22.

The memory unit 29 is a volatile storage medium, for example, a random access memory (RAM) or the like, and is used as a storage area of various kinds of data during an operation.

The recording unit 30 is a non-volatile storage medium, and a predetermined control program executed by the lens control unit 22 and various kinds of data such as parameters for adjustment are stored in the recording unit 30.

The power supply control unit 31 detects an amount of electricity of power supplied from the imaging device 60, and based on the detected amount of electricity, power is supplied by optimally allotting the amount of electricity to units (the lens control unit 22 and various drive units) inside the interchangeable lens 10.

On the other hand, the imaging device 60 that is the body side has the mount unit 71 in which the interchangeable lens 10 is detachably mounted. The mount unit 71 has 8 terminals BP1 to BP8 which electrically connect the device with the interchangeable lens 10.

When the interchangeable lens 10 is installed in the mount unit 71 of the imaging device 60, the terminals BP1 to BP8 of the mount unit 71 are electrically and physically connected to the terminals LP1 to LP8 of the mount unit 21 of the interchangeable lens 10. More specifically, the terminal BP1 is electrically and physically connected to the terminal LP1, the terminal BP2 is electrically and physically connected to the terminal LP2, and the terminal BP3 is electrically and physically connected to the terminal LP3 as shown in FIG. 1. The terminals BP4 to BP8 are also electrically and physically connected to the terminals LP4 to LP8 one-to-one. Terminal connection, however, is not limited thereto, and it is possible for some of the terminals not to be connected.

Furthermore, the imaging device 60 has a body control unit 72, a mechanical shutter 73, a shutter detection unit 74, a shutter drive unit 75, an image sensor 76, an image signal processing unit 77, a recording unit 78, a display unit 79, a power supply control unit 80, a power supply unit 81, and an operation unit 82.

The body control unit 72 is constituted by, for example, an arithmetic processing device such as a central processing unit (CPU) or a micro processing unit (MPU), a non-volatile memory, peripheral circuits, and the like, and reads and executes a predetermined control program stored in the internal non-volatile memory to control the whole imaging system 1.

The body control unit 72 causes the image sensor 76 to perform imaging based on, for example, an operation signal indicating a predetermined user operation supplied from the operation unit 82, and transmits a predetermined command to the interchangeable lens 10 via the mount unit 71 to drive a focus lens (the object-side focus lens 26 or the sensor-side focus lens 27), the zoom lens 23, or the like.

In addition, for example, lens position information of a focus lens, zoom position information of the zoom lens 23, and the like are supplied from the interchangeable lens 10 to the body control unit 72 via the mount unit 71, and the body control unit 72 causes the image sensor 76 to perform imaging of an image to be recorded in a recording unit 78 or an image to be transferred to an external apparatus at an optimum timing based on the information. An image (data thereof) obtained by the image sensor 76 is recorded (stored) in the recording unit 78 or displayed on the display unit 79 according to control of the body control unit 72.

The mechanical shutter 73 is disposed in the front of the image sensor 76 and is opened and closed according to control of the shutter drive unit 75. When the mechanical shutter 73 is in a closed state, light of a subject that has passed through the optical system of the interchangeable lens 10 is blocked. The shutter detection unit 74 detects open and closed states of the mechanical shutter 73, and supplies the states to the body control unit 72. The shutter drive unit 75 drives the mechanical shutter 73 to be in an open state or a closed state based on control of the body control unit 72.

The image sensor 76 is configured of, for example, a charge coupled device (CCD), a complementary metal oxide semiconductor (CMOS) sensor, or the like, images a subject, and generates and then outputs image data thereof.

Note that, when the image sensor 76 is configured of a CCD sensor or a CMOS sensor, an electronic shutter can be used, and thus the mechanical shutter 73 can be omitted. When the mechanical shutter 73 is omitted, the shutter detection unit 74 and the shutter drive unit 75 that are used for controlling the shutter are omitted as well.

The image signal processing unit 77 executes predetermined image signal processing on an image supplied from the image sensor 76. For example, the image signal processing unit 77 converts a raw image supplied from the image sensor 76 into image data of a predetermined file format, and records the result in the recording unit 78. In addition, the image signal processing unit 77 executes mosaicing on the raw image, and further performs reversible compression or irreversible compression to convert the image into image data of a predetermined file format, and records the data in the recording unit 78. In addition, for example, the image signal processing unit 77 converts image data supplied from the image sensor 76 into an image signal of a predetermined display format, and supplies the signal to the display unit 79 to cause a captured image to be displayed thereon.

The recording unit 78 is configured of, for example, a non-volatile memory, and records (stores) image data captured by the image sensor 76 and the like. A recording medium that serves as the recording unit 78 may be detachable.

The display unit 79 is configured of a panel-type display device such as a liquid crystal panel or an organic electro luminescence (EL) panel, and displays images (dynamic images or still images) supplied from the image signal processing unit 77. The display unit 79 is installed on the back side that is opposed to the front side on which the mount unit 71 is disposed to be capable of performing display of live-view images, display of preview images, and the like.

The power supply control unit 80 supplies power supplied from the power supply unit 81 to each of the units of the imaging device 60. In addition, the power supply control unit 80 computes an amount of electric power that can be supplied to the interchangeable lens 10 taking an operation state of the imaging device 60 into account, and then supplies power to the interchangeable lens 10 via the mount unit 71. The power supply unit 81 is constituted by, for example, a secondary battery such as a NiCd battery, a NiMH battery, or a Li battery, an AC adaptor, and the like.

The operation unit 82 includes hardware keys such as a shutter button 152, a mode dial 161, a zoom button 162, and the like (see FIG. 3) and software keys operated using a touch panel laminated on the display unit 79, receives predetermined operations performed by a user, and supplies an operation signal thereof to the body control unit 72. Operating the operation unit 82, the user can perform, for example, setting of a photographing mode, setting of a camera parameter, and the like.

The interchangeable lens 10 and the imaging device 60 that constitute the imaging system 1 are configured as described above.

Note that, when the interchangeable lens 10 is mounted on the imaging device 60, it is assumed that the mounting style of the mount unit 71 of the imaging device 60 is the same as that of the mount unit 21 of the interchangeable lens 10; however, when the mounting styles are different from each other, a mount adaptor that converts mounting styles is inserted between the imaging device 60 and the interchangeable lens 10.

<Mount Adaptor>

Figure 2:
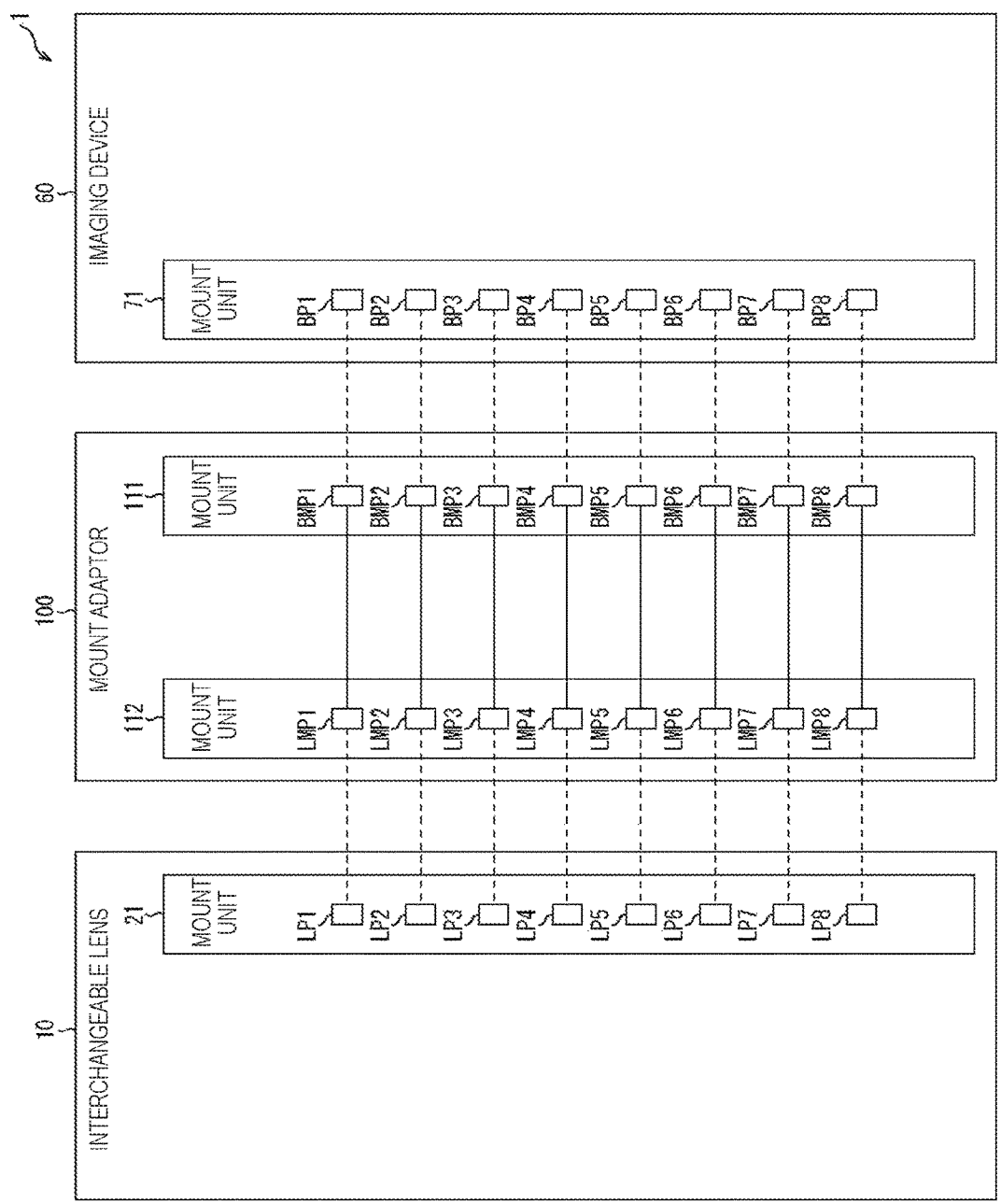
FIG. 2 is a block diagram showing a configuration example of the imaging system when a mount adaptor is used.

FIG. 2 is a block diagram showing a configuration example of the imaging system when a mount adaptor is used.

Note that, due to the limited space, the units of the interchangeable lens 10 and the imaging device 60 except for the mount unit 21 and the mount unit 71 are omitted in FIG. 2.

A mount adaptor 100 has a mount unit 111 that is mounted on the mount unit 71 of the imaging device 60 and a mount unit 112 that is mounted on the mount unit 21 of the interchangeable lens 10. The mounting style of the mount unit 111 is the same as that of the mount unit 71 of the imaging device 60, and the mounting style of the mount unit 112 is the same as that of the mount unit 21 of the interchangeable lens 10. In addition, the mounting styles of the mount units 111 and 112 of the mount adaptor 100 are different from each other.

The mount unit 111 of the mount adaptor 100 at the side of the imaging device 60 has terminals BMP1 to BMP8, and the terminals BMP1 to BMP8 are electrically and physically connected to the terminals BP1 to BP8 of the mount unit 71 of the imaging device 60 one-to-one.

On the other hand, the mount unit 112 at the side of the interchangeable lens 10 has terminals LMP1 to LMP8, and the terminals LMP1 to LMP8 are electrically and physically connected to the terminals LP1 to LP8 of the mount unit 21 of the interchangeable lens 10 one-to-one.

In the inside of the mount adaptor 100, the terminals BMP1 to BMP8 of the mount unit 111 are electrically and physically connected to the terminals LMP1 to LMP8 of the mount unit 112 one-to-one.

As described above, when the mounting style of the mount unit 71 of the imaging device 60 is different from that of the mount unit 21 of the interchangeable lens 10, the mount adaptor 100 is inserted therebetween so that the interchangeable lens 10 having the different mounting style can be mounted on the imaging device 60. Note that some of the terminals may not be connected to each other even when the mount adaptor 100 is interposed therebetween.

In addition, when the mounting styles of the imaging device 60 and the interchangeable lens 10 are the same, a teleconverter or the like may be mounted instead of the mount adaptor 100. In addition, a teleconverter may be further mounted on top of the mount adaptor 100.

In the description below, the mount unit 71 of the imaging device 60 will be referred to as a body-side mount unit 71, and the mount unit 21 of the interchangeable lens 10 will be referred to as a lens-side mount unit 21.

<Array of the Terminals of the Body-Side Mount Unit>

Next, an array of the terminals BP1 to BP8 of the body-side mount unit 71 will be described with reference to FIG. 3.

Figure 3:
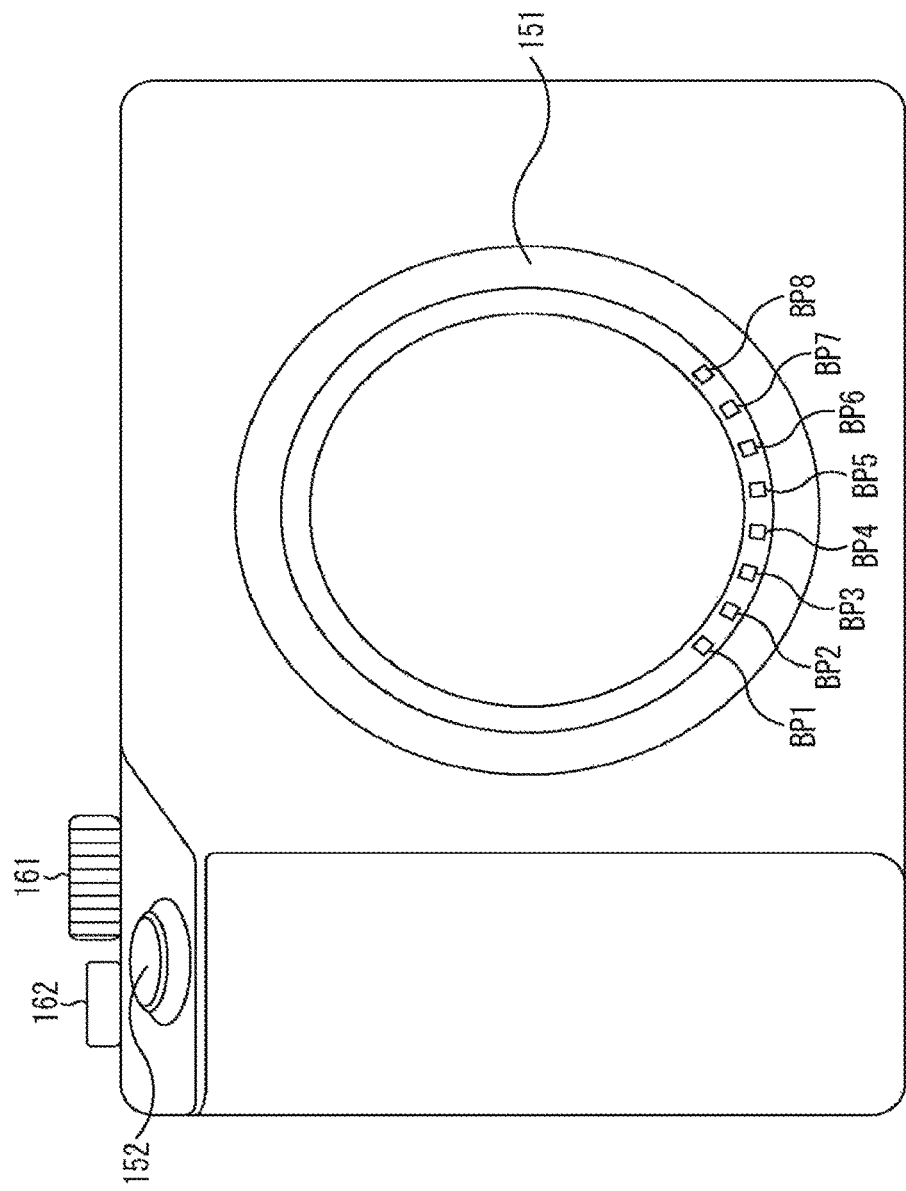
FIG. 3 is a front view of an imaging device showing a terminal array of a mount unit of the imaging device.

FIG. 3 is a front view taken when the imaging device 60 is viewed from the front side.

The terminals BP1 to BP8 of the body-side mount unit 71 are disposed in the order of the terminal BP1, the terminal BP2, the terminal BP3, the terminal BP4, the terminal BP5, the terminal BP6, the terminal BP7, and the terminal BP8 on the inner circumference side of a ring-shaped mount surface 151 from the left of the imaging device 60 on the front side thereof. Among the terminals BP1 to BP8, a middle point between the terminal BP4 and the terminal BP5 that is the center of the terminal array is disposed to be positioned on the inner circumference side in the lower direction (the ground surface direction) from the center of the mount surface 151.

A shutter button 152 is also disposed on the front side of the imaging device 60. In addition, the rotary-type mode dial 161 for deciding a photographing mode, the zoom button 162 for changing a zoom magnification, and the like are disposed in the vicinity of the shutter button 152 on the top surface of the imaging device 60.

<Array of the Terminals of the Lens-Side Mount Unit>

Next, an array of the terminals LP1 to LP8 of the lens-side mount unit 21 will be described with reference to FIG. 4.

Figures 4, 5:
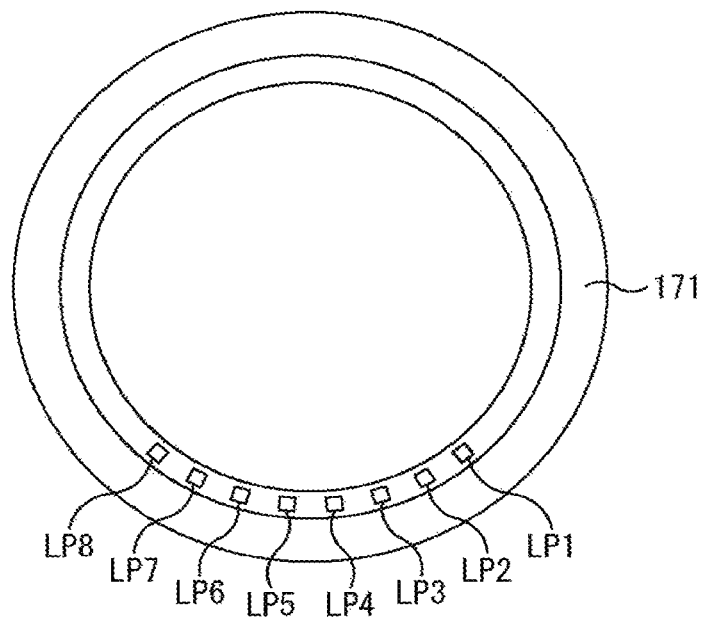
FIG. 4 is a front view of an interchangeable lens showing a terminal array of a mount unit of the interchangeable lens.
FIG. 5 is a diagram for describing functions of terminals of the mount unit.

FIG. 4 is a front view of the interchangeable lens 10 that has the surface on which the lens-side mount unit 21 is formed as a front surface.

Since the terminals LP1 to LP8 of the lens-side mount unit 21 are connected to the terminals BP1 to BP8 of the body-side mount unit 71 one-to-one, the terminals are disposed to be bilaterally symmetric with the terminals BP1 to BP8 of the body-side mount unit 71 when viewed from the front.

In other words, the terminals LP1 to LP8 of the lens-side mount unit 21 are disposed in the order of the terminal LP1, the terminal LP2, the terminal LP3, the terminal LP4, the terminal LP5, the terminal LP6, the terminal LP7, and the terminal LP8 from the right side of the interchangeable lens 10 on the inner circumference side of a ring-shaped mount surface 171 on the front side of the device. Among the terminals LP1 to LP8, a middle point between the terminal LP4 and the terminal LP5 that is the center of the terminal array is disposed to be positioned on the inner circumference side in the lower direction (the ground surface direction) from the center of the mount surface 171.

Note that, in the present embodiment shown in FIG. 3 and FIG. 4, the terminals BP1 to BP8 of the body-side mount unit 71 and the terminals LP1 to LP8 of the lens-side mount unit 21 are disposed on the lower side from the center of the ring-shaped mount surface 151 or 171; however, the terminals may be disposed on an upper side, a right side, or a left side therefrom.

<Functions of Respective Terminals>

Next, functions of respective terminals will be described with reference to FIG. 5.

The terminals at the terminal number 1, i.e., the terminal BP1 of the body-side mount unit 71 and the terminal LP1 of the lens-side mount unit 21, are chip select terminals that transfer chip select signals.

The terminals at the terminal number 2, i.e., the terminal BP2 of the body-side mount unit 71 and the terminal LP2 of the lens-side mount unit 21, are communication terminals that transfer serial data such as commands.

When serial data is transmitted using the communication terminals at the terminal number 2, a chip selection signal is transmitted from a transmission side to a reception side using the chip select terminals at the terminal number 1 before the transmission of the serial data. The reception side that has received the chip select signal recognizes that serial data will be transferred from the communication terminals at the terminal number 2.

The terminals at the terminal number 3, i.e., the terminal BP3 of the body-side mount unit 71 and the terminal LP3 of the lens-side mount unit 21, are communication terminals that transfer serial data such as commands.

The terminals at the terminal number 4, i.e., the terminal BP4 of the body-side mount unit 71 and the terminal LP4 of the lens-side mount unit 21, are chip select terminals that transfer chip select signals.

When serial data is transmitted using the communication terminals at the terminal number 3, a chip selection signal is transmitted from a transmission side to a reception side using the chip select terminals at the terminal number 4 before the transmission of the serial data. The reception side that has received the chip select signal recognizes that serial data will be transferred from the communication terminals at the terminal number 3.

The two communication terminals that transfer serial data are terminals adjacent to each other, and the communication terminals at the terminal numbers 2 and 3 that transfer serial data are disposed between the two chip select terminals (the terminals at the terminal numbers 1 and 4) that transfer chip select signals.

In addition, the terminal at the terminal number 1, which is adjacent to the communication terminal at the terminal number 2 that transfers serial data on the side opposed to the communication terminal at the terminal number 3 that also transfers serial data, is a chip select terminal that transfers chip select signals. Likewise, the terminal at the terminal number 4, which is adjacent to the communication terminal at the terminal number 3 that transfers serial data on the side opposed to the communication terminal at the terminal number 2 that also transfers serial data, is a chip select terminal that transfers chip select signals.

Next, the terminals at the terminal number 5, i.e., the terminal BP5 of the body-side mount unit 71 and the terminal LP5 of the lens-side mount unit 21, are power supply terminals that supply power from the imaging device 60 to the interchangeable lens 10.

The terminals at the terminal number 6, i.e., the terminal BP6 of the body-side mount unit 71 and the terminal LP6 of the lens-side mount unit 21, are synchronization signal terminals that transmit synchronization signals from the imaging device 60 to the interchangeable lens 10.

The terminals at the terminal number 7, i.e., the terminal BP7 of the body-side mount unit 71 and the terminal LP7 of the lens-side mount unit 21, are ground (GND) terminals. Note that these ground terminals can be omitted.

The terminals at the terminal number 8, i.e., the terminal BP8 of the body-side mount unit 71 and the terminal LP8 of the lens-side mount unit 21, are power supply terminals that supply power from the imaging device 60 to the interchangeable lens 10.

The power supply terminals at the terminal numbers 5 and 8 can be appropriately differently used in terms of design, for example, in which supply voltages are different (a high voltage and a low voltage), amounts of supply currents are different (a large amount of current and a small amount of current), or power using circuits are different (an analog circuit and a digital circuit).

A synchronization signal supplied from the imaging device 60 to the interchangeable lens 10 via the synchronization signal terminals at the terminal number 6 can be defined as (a) to (d) as follows: (a) a timing signal that serves as a periodic reference for a control event; (b) a trigger signal that serves as a periodic reference for a control event; (c) a timing signal at which a control unit transmits a control signal; and (d) a trigger signal at which a control unit transmits a control signal.

As the synchronization signal supplied from the imaging device 60 to the interchangeable lens 10 via the synchronization signal terminals at the terminal number 6, a vertical synchronization signal (v-synchronization signal), for example, can be employed. Here, the vertical synchronization signal is a synchronization signal for a video, and is also called V-SYNC or the like.

Viewing the disposition of the terminals from the terminal numbers 5 to 8, the synchronization signal terminals at the terminal number 6 and the ground terminals at the terminal number 7 are disposed between the power supply terminals of the terminal numbers 5 and 8. By setting a power supply line or a GND line on both sides of the synchronization signal terminals of the terminal number 6, a synchronization signal necessary for control is guarded to prevent crosstalk.

Note that, although the functions described above are assigned to the terminals BP1 to BP8 of the body-side mount unit 71 and the terminals LP1 to LP8 of the lens-side mount unit 21 in the present embodiment, the assignment of the functions to the terminals may be appropriately switched. In other words, the assignment of the functions to the terminals shown in FIG. 5 is merely an example, and the technology is not limited thereto. In addition, by setting the number of terminals to be disposed to 9 or more for both the body-side mount unit 71 and the lens-side mount unit 21, the functions described above may be disposed in an overlapping manner, or an extra function may be assigned. Furthermore, there may be terminals that are not connected to each other among the terminals corresponding to the body-side mount unit 71 and the lens-side mount unit 21, and terminals of one of the body-side mount unit 71 and the lens-side mount unit 21 may be disposed to be fewer in number than those of the other.

<Block Diagram with Regard to Communication Control>

Figure 6:
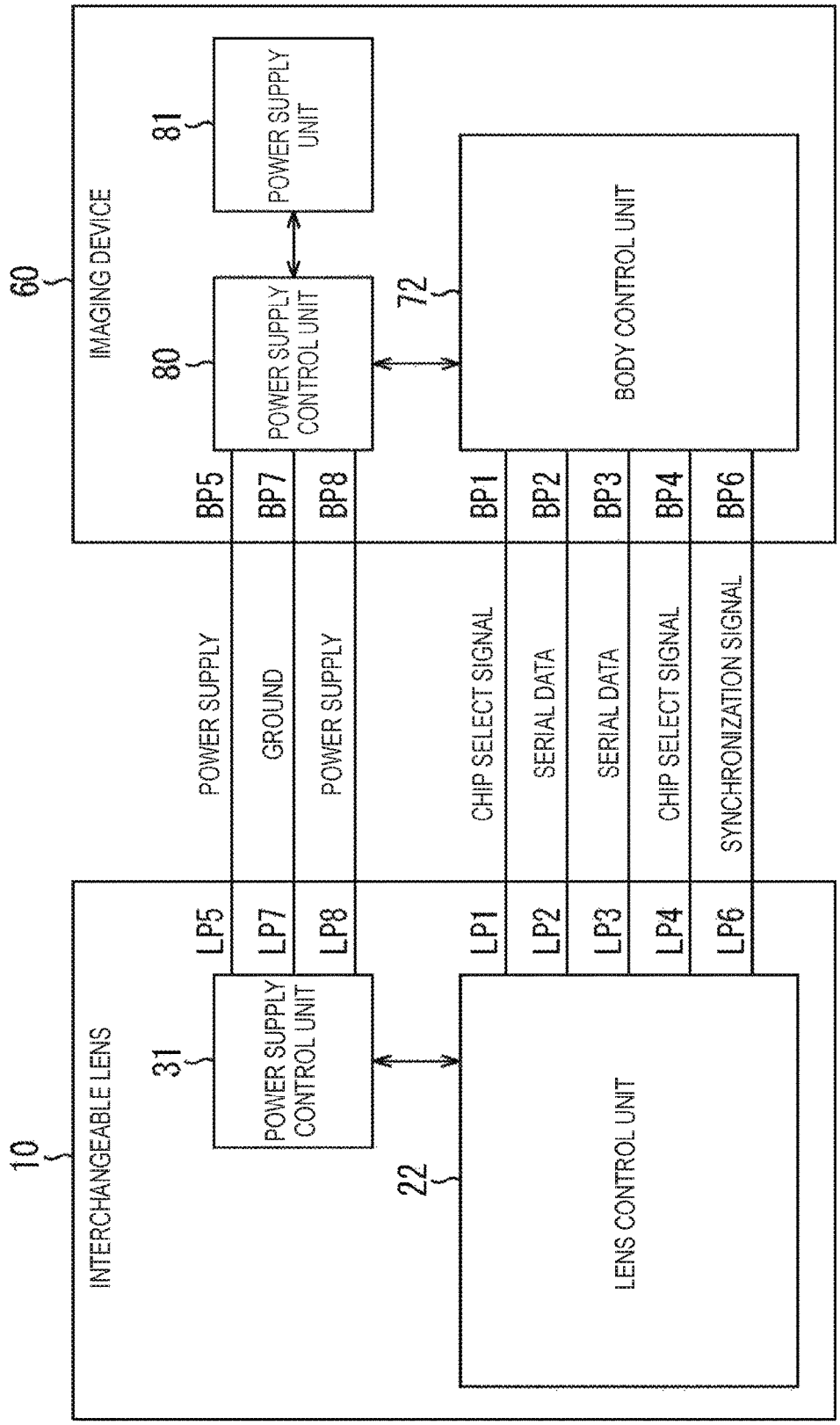
FIG. 6 is a block diagram regarding communication control.

FIG. 6 is a block diagram with regard to communication control between the interchangeable lens 10 and the imaging device 60.

Power is supplied from the power supply control unit 80 of the imaging device 60 to the power supply control unit 31 of the interchangeable lens 10 via the power supply terminals at the terminal number 5 and the power supply terminal at the terminal number 8. The power supply control unit 80 controls turning on and off of power supply to the interchangeable lens 10. The ground terminals at the terminal number 7 are connected to the power supply control unit 80 of the imaging device 60 and the power supply control unit 31 of the interchangeable lens 10.

A chip select signal transferred via the chip select terminals at the terminal number 1, serial data transferred via the communication terminals at the terminal number 2, serial data transferred via the chip select terminals at the terminal number 3, a chip select signal transferred via the communication terminals at the terminal number 4, and a synchronization signal transferred via the synchronization signal terminals at the terminal number 6 are exchanged between the body control unit 72 of the imaging device 60 and the lens control unit 22 of the interchangeable lens 10.

The body control unit 72 and the lens control unit 22 control communication via the communication terminals of the body-side mount unit 71 and the lens-side mount unit 21.

In the present embodiment, a transfer direction of serial data transferred via the communication terminals at the terminal number 2 and serial data transferred via the communication terminals at the terminal number 3 is not limited.

For example, the body control unit 72 may transmit a predetermined command to the lens control unit 22 using a communication terminal at the terminal number 2, and at the same time may transmit another predetermined command to the lens control unit 22 using the communication terminals at the terminal number 3.

In addition, for example, the lens control unit 22 may transmit a predetermined command to the body control unit 72 using the communication terminals at the terminal number 2, and at the same time may transmit another predetermined command to the body control unit 72 using the communication terminals at the terminal number 3.

In addition, for example, the body control unit 72 may transmit a predetermined command to the lens control unit 22 using the communication terminals at the terminal number 2, and at the same time, the lens control unit 22 may transmit another predetermined command to the body control unit 72 using the communication terminals at the terminal number 3.

In addition, for example, the lens control unit 22 may transmit a predetermined command to the body control unit 72 using the communication terminals at the terminal number 2, and at the same time, the body control unit 72 may transmit another predetermined command to the lens control unit 22 using the communication terminals at the terminal number 3.

In other words, one of the lens control unit 22 and the body control unit 72 transmits a chip select signal to the other using the chip select terminals at the terminal number 1 or 4, and the one obtaining the corresponding communication terminal has the right to transmit serial data.

However, the data transfer direction may be fixed such that, for example, the chip select terminals at the terminal number 1 and the communication terminals at the terminal number 2 are fixed as a terminal group of a direction in which serial data is transmitted from the body control unit 72 to the lens control unit 22 and the chip select terminals at the terminal number 3 and the communication terminals at the terminal number 4 are set as a terminal group of a direction in which serial data is transmitted from the lens control unit 22 to the body control unit 72. Of course, the data transfer direction to be fixed may be set to be reversed.

The body control unit 72 packetizes a command for controlling the interchangeable lens 10, and transmits the command to the lens control unit 22 via the communication terminals at the terminal number 2 or 3 in packet communication.

When responding to the command transmitted from the body control unit 72, the lens control unit 22 also packetizes a responsive command, and transmits the command to the body control unit 72 via the communication terminals in packet communication.

Figure 7:
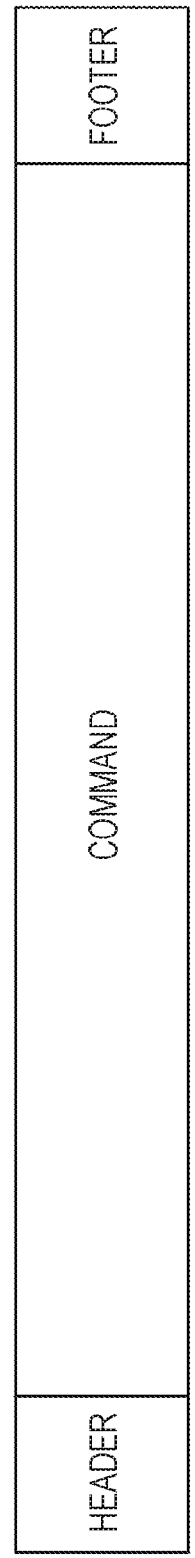
FIG. 7 is a diagram showing a format of a packet.

FIG. 7 shows a format of a packet used in packet communication between the lens control unit 22 and the body control unit 72.

One packet is composed of a header, a command, and a footer, the header is attached to the front of the command, and the footer is attached to the end of the command. The footer includes a checksum for checking for the presence of a communication error of a command of a reception side.

Upon receiving a command normally via communication terminals, a control unit (the lens control unit 22 or the body control unit 72) on a reception side may or may not reply with a response indicating that the command has been received depending on the type of the received command.

In addition, there are two types of commands exchanged between the lens control unit 22 and the body control unit 72, which are a synchronous command for performing communication synchronously with a synchronization signal and an asynchronous command for performing communication at an arbitrary timing without depending on a timing of a synchronization signal. Here, a synchronization signal used in a synchronous command includes not only a synchronization signal transferred via a synchronization signal terminal but also a signal obtained by dividing or multiplying the synchronization signal. Consequently, the lens control unit 22 performs communication with the body control unit 72 according to a synchronous command based on a synchronization signal or a signal obtained by dividing or multiplying the synchronization signal. When communication is performed based on a signal obtained by dividing or multiplying the synchronization signal, the lens control unit 22 also performs a process of generating the signal obtained by dividing or multiplying the synchronization signal transferred via the synchronization signal terminals.

Since a synchronous command is communicated synchronously with a synchronization signal, a timing at which a second synchronization signal is transmitted after a first synchronous command is transmitted is a timing of a synchronization signal after a synchronization signal on which the first synchronous command is transmitted.

A synchronous command is used as, for example, a command of the lens control unit 22 to notify the body control unit 72 of a state of a lens of the interchangeable lens 10. Specifically, when the lens control unit 22 transmits position information of the zoom lens 23, the aperture 25, the object-side focus lens 26, and the sensor-side focus lens 27, a synchronous command is used. In addition, a synchronous command is also used when a predetermined operation is instructed from the body control unit 72 to the lens control unit 22.

On the other hand, an asynchronous command is used, when, for example, a communication error of a command occurs in the interchangeable lens 10, to immediately notify the body control unit 72 of the occurrence of the communication error. In other words, the lens control unit 22 detects the presence of a communication error of a command transmitted from the body control unit 72 by determining the checksum, and a communication error is detected, and the lens control unit transmits the fact that the communication error has occurred to the body control unit 72 with an asynchronous command. Accordingly, the body control unit 72 that receives the asynchronous command indicating that the communication error has occurred can immediately perform a recovery process to recover from the communication error.

In addition, an asynchronous command is used by the imaging device 60 to command the interchangeable lens 10 to execute an initialization process and by the interchangeable lens 10 to notify the imaging device 60 of completion of the initialization process when the interchangeable lens 10 is mounted on the imaging device 60.

More specifically, when the interchangeable lens 10 is mounted on the imaging device 60, the body control unit 72 of the imaging device 60 transmits a command to execute the initialization process to the lens control unit 22 using an asynchronous command. The lens control unit 22 that has received the asynchronous command for execution of the initialization process starts initialization of each of the optical components inside the interchangeable lens 10, i.e., the zoom lens 23, the camera shake correction lens 24, the aperture 25, the object-side focus lens 26, and the sensor-side focus lens 27. During the initialization process, the lens control unit 22 does not give successive notifications with regard to initialization statuses of the optical components.

The lens control unit 22 transmits a command indicating that the initialization has completed for each of the optical components to the body control unit 72 using an asynchronous command at a timing at which each of the optical components inside the interchangeable lens 10 completes the initialization process. For example, an asynchronous command with regard to the completion of initialization of a zoom lens is transmitted at the timing at which the zoom lens 23 completes the initialization process, and an asynchronous command with regard to the completion of initialization of the aperture is transmitted at the timing at which the aperture 25 completes the initialization process.

The body control unit 72 that has received the asynchronous command indicating the completion of the initialization for each optical component starts an initialization process on the body side that corresponds to the optical component that has completed the initialization for each optical component for which the command has been received. For example, upon receiving the asynchronous command with regard to the completion of the initialization of the aperture 25, the body control unit 72 starts an exposure control process of the body side. The completion notifications of the initialization processes are successively transmitted in asynchronous commands with regard to each of the optical components of the interchangeable lens 10, and the imaging device 60 sequentially starts necessary initialization operations according to the optical components for which the completion notifications of the initialization have been received, and therefore it is possible to speed up a starting time.

A transmission side can transmit an asynchronous command at an arbitrary timing, and a reception side that receives the asynchronous command can execute a process corresponding to the received asynchronous command, without replying that the asynchronous command has been received.

Furthermore, an asynchronous command can also be used by the lens control unit 22 to notify the body control unit 72 of information of a drive amount or speed information of a focus lens. The drive amount information of the focus lens is information different from position information of the focus lens transmitted in a synchronous command.

In addition, as an example of an asynchronous command transmitted from the body control unit 72 to the lens control unit 22, for example, when the body control unit 72 switches power supply via the power supply terminals at the terminal number 5 or the power supply terminals at the terminal 8 to be on or off, the content is transmitted from the body control unit 72 to the lens control unit 22 in an asynchronous command.

Both types of communication using a synchronous command (synchronous communication) and communication using an asynchronous command (asynchronous communication) are non-exclusive communication. In other words, even when the control unit of the reception side receives a predetermined synchronous command and performs a process corresponding to the received synchronous command, the control unit of the transmission side on the other side can transmit a next synchronous command without awaiting a command with regard to the termination of the process corresponding to the transmitted synchronous command or a response thereto. The same applies to an asynchronous command. In addition, a command transmission direction can be any of the directions from the lens control unit 22 to the body control unit 72 and from the body control unit 72 to the lens control unit 22, in other words, non-exclusive transmission can be performed in both directions. Accordingly, there is no limit on timings to transmit a command, thus the degree of freedom in communication increases, and therefore it is possible to speed up control of the interchangeable lens 10 and control of the imaging device 60.

In synchronous communication using a synchronous command and asynchronous communication using an asynchronous command, both the communication terminals at the terminal number 2 and the communication terminals at the terminal number 3 are used. In other words, the communication terminals at the terminal numbers 2 and 3 are shared communication terminals that are shared and used in synchronous communication using a synchronous command and in asynchronous communication using an asynchronous command. Since the interchangeable lens 10 and the imaging device 60 of the imaging system 1 have the shared communication terminals that are shared and used in synchronous communication using a synchronous command and asynchronous communication using an asynchronous command, the number of communication terminals can be reduced, and thus efficient communication can be performed with a small number of terminals.

Although the body-side mount unit 71 and the lens-side mount unit 21 each have the two shared communication terminals in the present embodiment as described above, the units may each have at least one shared communication terminal.

<Command Transmission Control Process>

Figure 8:
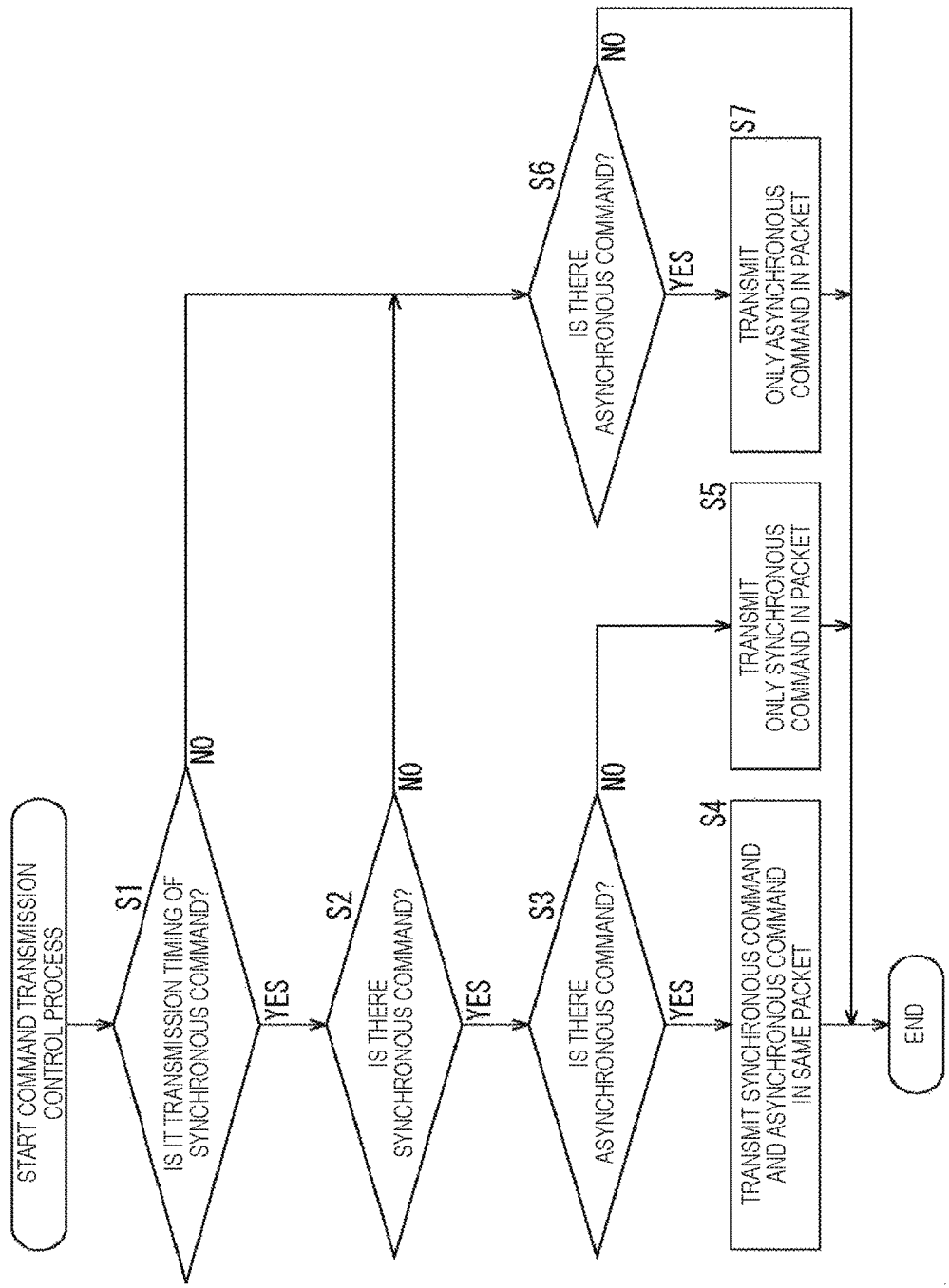
FIG. 8 is a flowchart describing a command transmission control process.

Next, a command transmission control process that is a control process performed when the lens control unit 22 transmits a command to the body control unit 72 will be described with reference to the flowchart of FIG. 8. The command transmission control process of FIG. 8 is repeated in, for example, a cycle obtained by multiplying a synchronization signal or a cycle shorter than the multiplied cycle.

First, the lens control unit 22 determines whether it is a transmission timing of a synchronous command in Step S1.

When it is determined to be a transmission timing of a synchronous command in Step S1, the lens control unit 22 determines whether there is a synchronous command to be transmitted to the body control unit 72 in Step S2.

When the lens control unit 22 generates a synchronous command, for example, position information of a focus lens or the like, to be transmitted to the body control unit 72 in accordance with control of the interchangeable lens 10, the lens control unit stores the command in a queue buffer for synchronous commands inside the lens control unit 22. In Step S2, the lens control unit 22 determines whether or not there is a synchronous command to be transmitted to the body control unit 72 in the queue buffer for synchronous commands.

When it is determined that there is a synchronous command to be transmitted to the body control unit 72 in Step S2, the process proceeds to Step S3, and the lens control unit 22 determines whether there is an asynchronous command to be transmitted to the body control unit 72.

When the lens control unit 22 generates an asynchronous command, for example, information of a drive amount of a focus lens, or the like, to be transmitted to the body control unit 72 in accordance with control of the interchangeable lens 10, the lens control unit stores the command in a queue buffer for asynchronous commands inside the lens control unit 22. In Step S3, the lens control unit 22 determines whether there is an asynchronous command to be transmitted to the body control unit 72 in the queue buffer for asynchronous commands.

When it is determined that there is an asynchronous command in Step S3, the process proceeds to Step S4, and the lens control unit 22 transmits the synchronous command and the asynchronous command in the queue buffers to the body control unit 72 using the same packet, and terminates the process.

Figure 9:
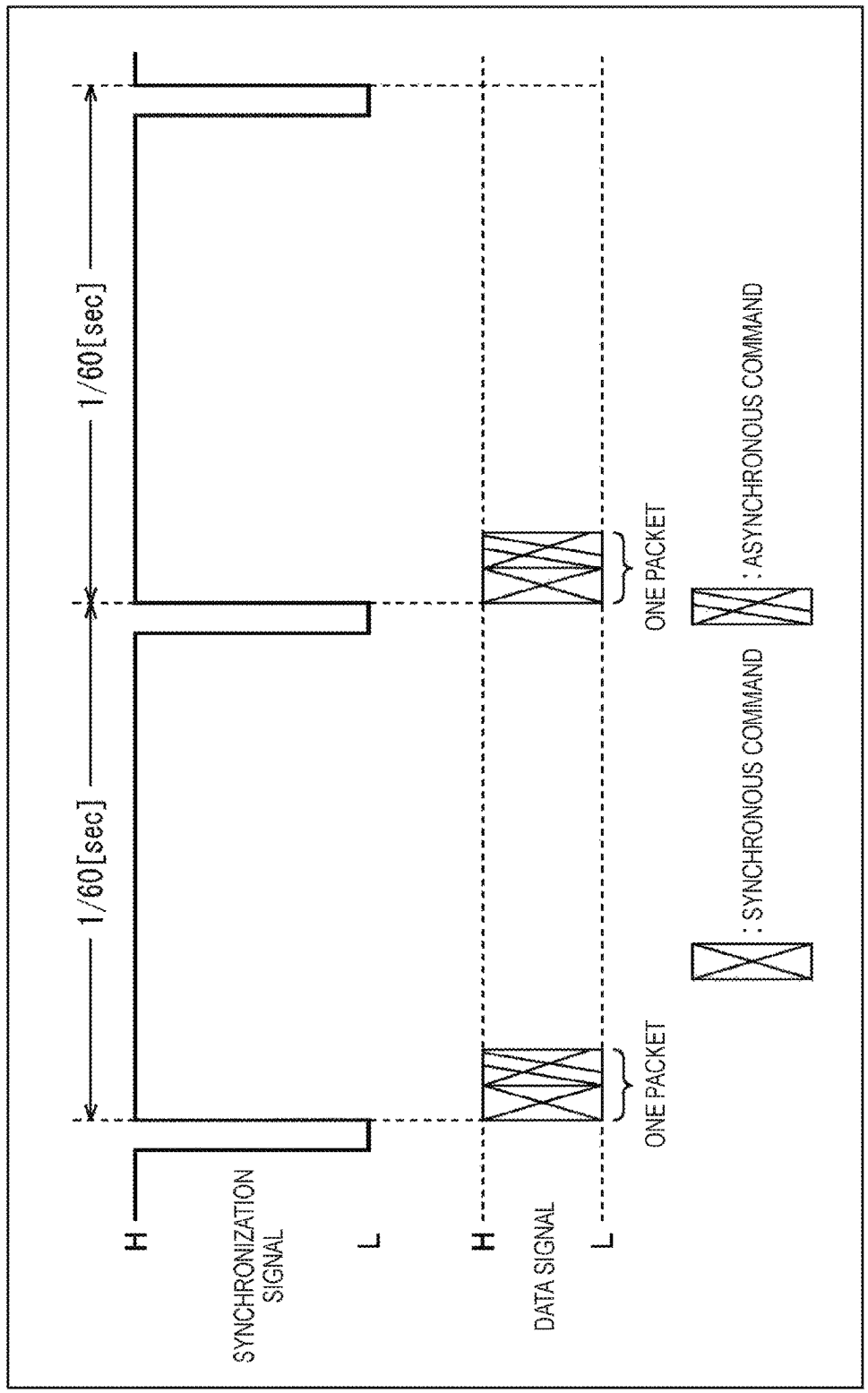
FIG. 9 is a time chart showing an example of packet communication of Step S4 of FIG. 8.

FIG. 9 is a time chart showing an example of packet communication executed as Step S4.

In FIG. 9, a cycle of a synchronization signal is 1/60 sec, and a minimum transmission interval of a synchronous command is 1/60 sec.

When there is an asynchronous command at a transmission timing of a synchronous command, the synchronous command and the asynchronous command are multiplexed and transmitted in one packet as shown in FIG. 9. The state in FIG. 9 in which the synchronous command and the asynchronous command are in contact with each other indicates that the synchronous command and the asynchronous command are transmitted in one packet.

On the other hand, when it is determined that there is no asynchronous command in Step S3, the process proceeds to Step S5, and the lens control unit 22 only transmits the synchronous command to the body control unit 72 in a packet, and terminates the process.

Figure 10:
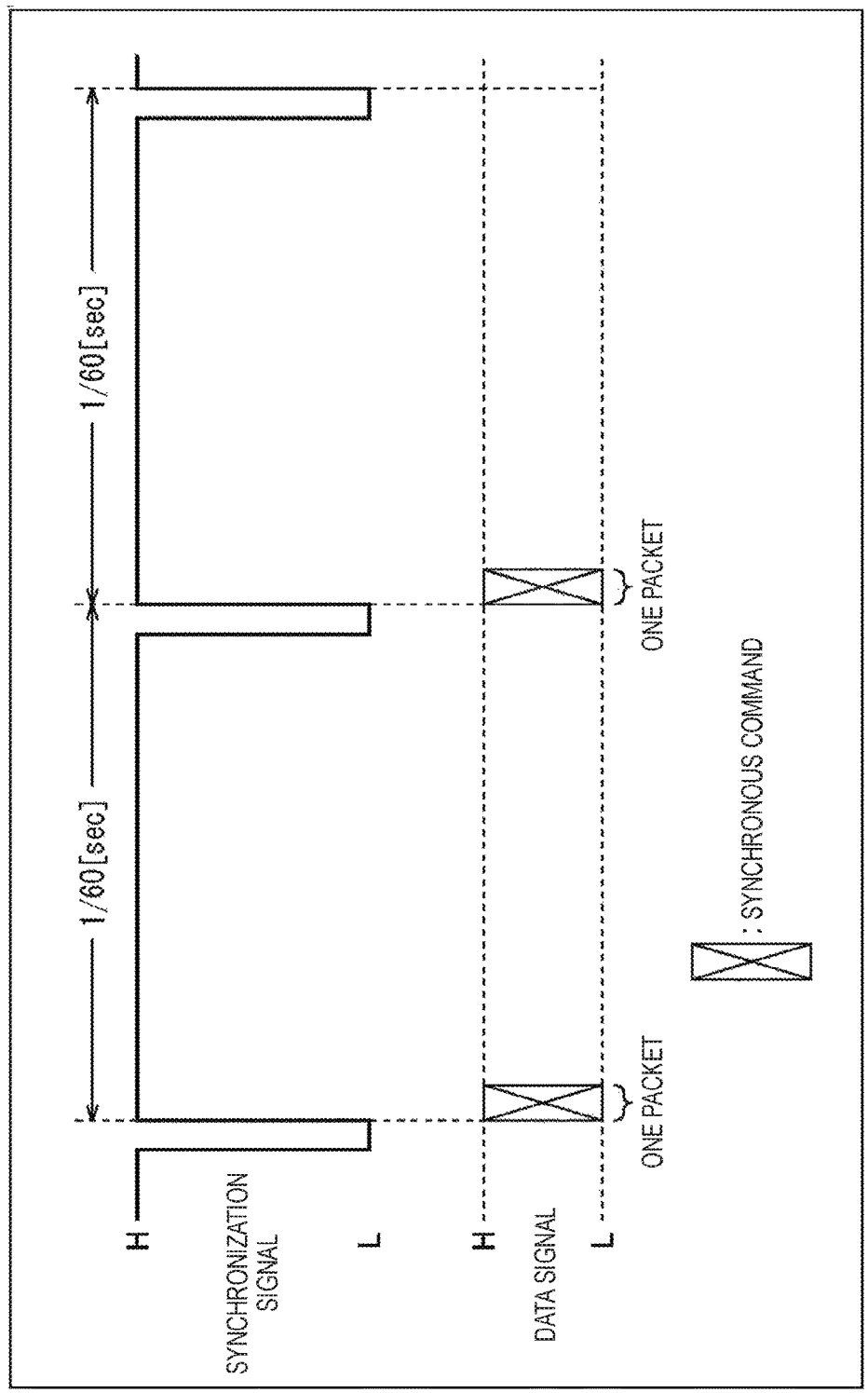
FIG. 10 is a time chart showing an example of packet communication of Step S5 of FIG. 8.

FIG. 10 is a time chart showing an example of packet communication executed as Step S5.

When there is no asynchronous command at a transmission timing of a synchronous command, only the synchronous command is transmitted in one packet as shown in FIG. 10.

On the other hand, when it is determined that it is not a transmission timing of a synchronous command in Step S1, or when it is determined that there is no synchronous command to be transmitted to the body control unit 72 in Step S2, the process proceeds to Step S6, and the lens control unit 22 determines whether there is an asynchronous command to be transmitted to the body control unit 72 in the queue buffer for asynchronous commands.

When it is determined that there is an asynchronous command in Step S6, the process proceeds to Step S7, and the lens control unit 22 only transmits the asynchronous command to the body control unit 72, and then terminates the process.

FIG. 11 is a time chart showing an example of packet communication executed as Step S7.

When there is an asynchronous command at a timing other than a transmission timing of a synchronous command, transmission of a packet is performed only for the asynchronous command as shown in FIG. 11. When there are a plurality of asynchronous commands, the plurality of asynchronous commands are multiplexed and transmitted in one packet. The state in FIG. 11 in which two asynchronous commands are in contact with each other indicates that the two asynchronous commands are transmitted in one packet. Asynchronous commands can be transmitted even at a timing that does not correspond to the cycle of a synchronization signal or the cycle obtained by multiplying a synchronization signal.

On the other hand, when it is determined that there is no asynchronous command in Step S6, the lens control unit 22 just terminates the process. In other words, when it is determined that there is no asynchronous command in Step S6, the process ends with neither a synchronous command nor an asynchronous command transmitted.

The command transmission control process described above is a process performed when the lens control unit 22 transmits a command to the body control unit 72, and this command transmission control process is also executed when a command is transmitted from the body control unit 72 to the lens control unit 22 in the same manner.

When a timing at which an asynchronous command is to be transmitted coincides with a timing at which a synchronous command is to be transmitted, the body control unit 72 and the lens control unit 22 can transmit the asynchronous command and the synchronous command in the same packet as described above.

For example, an asynchronous command indicating speed information of a focus lens and a synchronous command indicating position information of the focus lens are multiplexed and stored in the command part of the format of a packet shown in FIG. 7. A checksum for checking for the presence of a communication error is calculated in units of packets and stored in the footer. Because a checksum determination process is performed for each packet, an amount of the checksum determination process can be reduced by multiplexing and transmitting an asynchronous command and a synchronous command in one packet, which contributes to reduction of an arithmetic processing amount and a processing time imposed on a reception side.

In addition, by transmitting an asynchronous command and a synchronous command in the same packet, an amount of data communication can be reduced, and thus data can be transmitted and received with high efficiency. Further, it contributes to low power consumption.

Note that steps written in the flowcharts accompanying this specification may of course be executed in a time series in the illustrated order, but such steps do not have to be executed in a time series and may be carried out in parallel or at necessary timing, such as when the processes are called.

In the present specification, a system has the meaning of a set of a plurality of configured elements (such as a device or a module (part)), and does not take into account whether or not all the configured elements are in the same casing. Therefore, the system may be either a plurality of devices that are stored in separate casings and connected through a network, or a plurality of modules within a single casing.

An embodiment of the present technology is not limited to the embodiments described above, and various changes and modifications may be made without departing from the scope of the present technology.

The effects described in the present specification are not limiting but are merely examples, and there may be additional effects.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An interchangeable lens including:
   at least one shared communication terminal configured to be shared and used in synchronous communication that is communication performed synchronously with a synchronization signal and in asynchronous communication that is communication performed asynchronously with the synchronization signal.

(2) The interchangeable lens according to (1), wherein the synchronization signal is a vertical synchronization signal or a signal obtained by dividing or multiplying the vertical synchronization signal.

(3) The interchangeable lens according to (1) or (2), wherein both the synchronous communication and the asynchronous communication are non-exclusive communication.

(4) The interchangeable lens according to any of (1) to (3), further including:
   a control unit configured to transmit a command of the asynchronous communication and a command of the synchronous communication to an imaging device in a same packet via the shared communication terminal in a case where a timing at which the command of the asynchronous communication is to be transmitted to the imaging device coincides with a timing at which the command of the synchronous communication is to be transmitted.

(5) The interchangeable lens according to any of (2) to (4), wherein serial data is transferred as the synchronous communication and the asynchronous communication that are communication using the at least one shared communication terminal.

(6) The interchangeable lens according to any of (2) to (5), wherein the at least one shared communication terminal is composed of a first shared communication terminal and a second shared communication terminal that are disposed adjacent to each other.

(7) The interchangeable lens according to (6), further including:
   a chip select terminal that is disposed adjacent to the first shared communication terminal on aside opposed to the second shared communication terminal to transfer a chip select signal.

(8) The interchangeable lens according to (6), wherein the first shared communication terminal and the second shared communication terminal are disposed between two chip select terminals that transfer chip select signals.

(9) The interchangeable lens according to any of (1) to (8), further including:
   a synchronization signal terminal configured to communicate the synchronization signal; and
   two power supply terminals,
   wherein the synchronization signal terminal is disposed between the two power supply terminals.

(10) The interchangeable lens according to (9), further including:
   a ground terminal between the two power supply terminals.

(11) The interchangeable lens according to any of (1) to (10), further including:
   a control unit configured to control the synchronous communication and the asynchronous communication via the shared communication terminal.

(12) The interchangeable lens according to (11), wherein the control unit transmits a command of the synchronous communication to an imaging device based on a signal obtained by dividing or multiplying the synchronization signal.

(13) The interchangeable lens according to (11) or (12), wherein, in a case where a communication error of a command that has passed the shared communication terminal occurs, the control unit transmits information indicating that the communication error has occurred to an imaging device in the asynchronous communication.

(14) The interchangeable lens according to (13), wherein the control unit detects the communication error by determining a checksum.

(15) The interchangeable lens according to any of (11) to (14), wherein, in a case where a command is received normally in communication via the shared communication terminal, the control unit does not reply with a response indicating that the command has been received.

(16) The interchangeable lens according to any of (11) to (15), further including:
   a focus lens that includes one or a plurality of optical components,
   wherein the control unit transmits at least one of information of a drive amount of the focus lens and speed information of the focus lens to an imaging device in the asynchronous communication.

(17) A communication method performed by an interchangeable lens which includes at least one shared communication terminal that is shared and used in synchronous communication that is communication performed synchronously with a synchronization signal and in asynchronous communication that is communication performed asynchronously with the synchronization signal, the communication method including:
   communicating a command of the synchronous communication and a command of the asynchronous communication via the at least one shared communication terminal.

(18) An imaging device including:
   at least one shared communication terminal configured to be shared and used in synchronous communication that is communication performed synchronously with a synchronization signal and in asynchronous communication that is communication performed asynchronously with the synchronization signal.

(19) A communication method performed by an imaging device which includes at least one shared communication terminal that is shared and used in synchronous communication that is communication performed synchronously with a synchronization signal and in asynchronous communication that is communication performed asynchronously with the synchronization signal, the communication method including:
   communicating a command of the synchronous communication and a command of the asynchronous communication via the at least one shared communication terminal.

The invention claimed is:

1. An interchangeable lens, comprising:
   a mounting device having a plurality of communication terminals including a shared communication terminal, the shared communication terminal being configured to be shared and used in synchronous communication and asynchronous communication; and
   circuitry configured to
      control communication via the plurality of communication terminals, and
      control transmission of a packet including at least one of a command of the asynchronous communication and a command of the synchronous communication via the shared communication terminal, wherein the synchronous communication is performed synchronously with respect to a synchronization signal, the asynchronous communication is performed asynchronously with respect to the synchronization signal, and when a timing at which the command of the asynchronous communication is to be transmitted to an imaging device coincides with a timing at which the command of the synchronous communication is to be transmitted to the imaging device, the packet includes both the command of the asynchronous communication and the command of the synchronous communication.

2. The interchangeable lens according to claim 1, wherein the packet includes at least one of the command of the asynchronous communication, the command of the synchronous communication and a checksum determined for the packet.

3. The interchangeable lens according to claim 2, further comprising:
a focus lens that includes at least one optical component, wherein
the circuitry further configured to
control driving of a focus lens, and
control transmission of speed information, that indicates a speed of the focus lens, to an imaging device in the asynchronous communication.

4. The interchangeable lens according to claim 3, wherein the synchronization signal is a vertical synchronization signal or a signal obtained by dividing or multiplying the vertical synchronization signal.

5. The interchangeable lens according to claim 3, wherein the circuitry transmits a command of the synchronous communication to an imaging device based on a signal obtained by dividing or multiplying the synchronization signal.

6. The interchangeable lens according to claim 1, wherein both the synchronous communication and the asynchronous communication are non-exclusive communication.

7. A communication method of an interchangeable lens, the communication method comprising:
communicating, by circuitry of the interchangeable lens via a plurality of communication terminals of a mounting device of the interchangeable lens, the plurality of communication terminals including a shared communication terminal that is configured to be shared and used in synchronous communication and asynchronous communication; and
controlling transmission, by the circuitry, of a packet including at least one of a command of the asynchronous communication and a command of the synchronous communication via the shared communication terminal, wherein
the synchronous communication is performed synchronously with respect to a synchronization signal,
the asynchronous communication is performed asynchronously with respect to the synchronization signal, and
when a timing at which the command of the asynchronous communication is to be transmitted to an imaging device coincides with a timing at which the command of the synchronous communication is to be transmitted to the imaging device, the packet includes both the command of the asynchronous communication and the command of the synchronous communication.

8. The communication method according to claim 7, wherein
the packet includes at least one of the command of the asynchronous communication, the command of the synchronous communication and a checksum determined for the packet.

9. The communication method according to claim 8, further comprising:
driving a focus lens of the interchangeable lens, the focus lens including at least one optical component; and
transmitting speed information, that indicates a speed of the focus lens, to an imaging device in the asynchronous communication.

10. The communication method according to claim 9, wherein the synchronization signal is a vertical synchronization signal or a signal obtained by dividing or multiplying the vertical synchronization signal.

11. The communication method according to claim 9, further comprising:
transmitting a command of the synchronous communication to an imaging device based on a signal obtained by dividing or multiplying the synchronization signal.

12. The communication method according to claim 7, wherein both the synchronous communication and the asynchronous communication are non-exclusive communication.

13. An imaging device, comprising:
a mounting device having a plurality of communication terminals including a shared communication terminal, the shared communication terminal being configured to be shared and used in synchronous communication and asynchronous communication; and
circuitry configured to
control communication via the plurality of communication terminals, and
control transmission of a packet including at least one of a command of the asynchronous communication and a command of the synchronous communication via the shared communication terminal, wherein
the synchronous communication is performed synchronously with respect to a synchronization signal,
the asynchronous communication is performed asynchronously with respect to the synchronization signal, and
when a timing at which the command of the asynchronous communication is to be transmitted to an interchangeable lens coincides with a timing at which the command of the synchronous communication is to be transmitted to the interchangeable lens, the packet includes both the command of the asynchronous communication and the command of the synchronous communication.

14. The imaging device according to claim 13, wherein the packet includes at least one of the command of the asynchronous communication, the command of the synchronous communication and a checksum determined for the packet.

15. The imaging device according to claim 14, wherein the interchangeable lens includes a focus lens,
the focus lens includes at least one optical component, and
the circuitry is further configured to
control driving of a focus lens, and
control transmission of speed information, that indicates a speed of the focus lens, to an imaging device in the asynchronous communication.

16. The imaging device according to claim 15, wherein the synchronization signal is a vertical synchronization signal or a signal obtained by dividing or multiplying the vertical synchronization signal.

17. A communication method of an imaging device, the communication method comprising:
communicating, by circuitry of the interchangeable lens via a plurality of communication terminals of a mounting device of the interchangeable lens, the plurality of communication terminals including a shared communication terminal that is configured to be shared and used in synchronous communication and asynchronous communication; and controlling transmission, by the circuitry, of a packet including at least one of a command of the asynchronous communication and a command of the synchronous communication via the shared communication terminal, wherein the synchronous communication is performed synchronously with respect to a synchronization signal, the asynchronous communication is performed asynchronously with respect to a synchronization signal, and when a timing at which the command of the asynchronous communication is to be transmitted to an interchangeable lens coincides with a timing at which the command of the synchronous communication is to be transmitted to the interchangeable lens, the packet includes both the command of the asynchronous communication and the command of the synchronous communication.

18. The communication method according to claim 17, wherein the packet includes at least one of the command of the asynchronous communication, the command of the synchronous communication and a checksum determined for the packet.

19. The communication method according to claim 18, further comprising:

driving a focus lens of the interchangeable lens, the focus lens including at least one optical component; and transmitting speed information, that indicates a speed of the focus lens, to an imaging device in the asynchronous communication.

20. The communication method according to claim 19, wherein the synchronization signal is a vertical synchronization signal or a signal obtained by dividing or multiplying the vertical synchronization signal.

* * * * *